United States Patent
Zhang et al.

(10) Patent No.: US 7,800,974 B2
(45) Date of Patent: Sep. 21, 2010

(54) ADJUSTABLE PIPELINE IN A MEMORY CIRCUIT

(75) Inventors: Shayan Zhang, Austin, TX (US); William C. Moyer, Dripping Springs, TX (US); Huy B. Nguyen, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 89 days.

(21) Appl. No.: 12/034,888

(22) Filed: Feb. 21, 2008

(65) Prior Publication Data

US 2009/0213668 A1 Aug. 27, 2009

(51) Int. Cl.
*G11C 8/00* (2006.01)

(52) U.S. Cl. ............ 365/233.1; 365/194; 365/205; 365/227

(58) Field of Classification Search ............ 365/194, 365/205, 227, 233.1
See application file for complete search history.

(56) References Cited

U.S. PATENT DOCUMENTS

| | | | |
|---|---|---|---|
| 5,809,552 A * | 9/1998 | Kuroiwa et al. | 711/169 |
| 6,772,312 B2 | 8/2004 | Mes | |
| 7,017,022 B2 | 3/2006 | Jeddeloh | |
| 2002/0003747 A1 * | 1/2002 | Yahata et al. | 365/233 |
| 2003/0135794 A1 * | 7/2003 | Longwell et al. | 714/42 |
| 2003/0226000 A1 | 12/2003 | Rhoades | |
| 2007/0271449 A1 | 11/2007 | Lichtensteiger et al. | |
| 2008/0320292 A1 * | 12/2008 | Croxford et al. | 713/1 |

OTHER PUBLICATIONS

U.S. Appl. No. 11/619,070, filed Jan. 2, 2007, entitled "System Having a Memory Voltage Controller and Method Therefor," naming Prashant Kenkare and William C. Moyer inventors.
PCT Search Report and Written Opinion, PCT/US2009/031202, Mailed Jun. 30, 2009.

* cited by examiner

*Primary Examiner*—Hoai V Ho
(74) *Attorney, Agent, or Firm*—Zagorin O'Brien Graham LLP (57) ABSTRACT

A technique for operating a memory circuit that improves performance of the memory circuit and/or power consumption for at least some operating points of the memory circuit includes adjusting a number of operational pipeline stages at least partially based on an operating point of the memory. In at least one embodiment of the invention, a method for operating a memory circuit includes selecting a mode of operating the memory circuit at least partially based on a feedback signal generated by the memory circuit. The technique includes operating the memory circuit using a number of pipeline stages based on the selected mode of operation of the memory circuit. In at least one embodiment of the invention, the technique includes sensing a timing margin associated with an individual pipeline stage and generating the feedback signal based thereon.

24 Claims, 9 Drawing Sheets

ADJUSTABLE PIPELINE IN A MEMORY CIRCUIT

BACKGROUND

1. Field of the Invention

This disclosure relates generally to memory systems, and more specifically, to pipelined memory systems.

2. Description of the Related Art

In general, a memory circuit is designed to meet a particular performance target at a particular operating point. Performance targets may be defined by latency and power consumption of the memory circuit at a peak performance operating point, e.g., peak control clock signal frequency and a particular power supply voltage. To achieve the performance target, the memory circuit may be pipeline-accessed with state elements (e.g., latch circuits, flip-flops, or other suitable state elements) inserted between logic circuits. Typically, individual pipeline stages of a pipelined memory circuit are designed to utilize the entire period of the control clock signal at the operating point associated with the performance target. However, the propagation delay through an individual pipeline stage of the pipelined memory circuit, i.e., the delay from the input of the individual pipeline stage to the output of the individual pipeline stage, is not constant in real operating conditions. The propagation delay may change due to variations in temperature, power supply voltage, or other operating conditions.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

In a typical pipelined memory circuit, individual pipeline stages of the pipelined memory circuit may utilize the entire portion of the control clock signal allocated to the pipeline stage, which may be an entire period of the control clock signal. Although pipelining may improve performance of a memory circuit while the memory is operating at a target operating point, pipelining may limit memory performance of the memory circuit at other operating points. The latency of a typical pipelined memory circuit degrades monotonically as the control clock signal frequency is reduced, while timing margin increases in individual pipeline stages. As referred to herein, timing margin of a pipeline stage is the difference between a portion of the clock signal allocated to a pipeline stage when operating at a target frequency and the time required for the pipeline stage to complete processing an input and generate an output. When the pipelined memory circuit is configured for the operating point associated with a performance target, the memory circuit consumes more power than at other operating points (e.g., lower power supply voltage and/or lower control clock signal frequency). Generally, in a pipelined memory circuit, the number of state elements (e.g., latches, flip-flops, or other suitable state elements) increases exponentially with increases in the size of the memory circuit, and power consumption of those state elements is a substantial portion of total memory power consumption.

Consequently, the relationship between performance and power consumption of a pipelined memory circuit may not improve proportionally to scaling of the power supply voltage level and/or control clock signal frequency. In addition, memory circuit designs that meet particular target operating conditions (e.g., particular frequency and power supply voltage levels) for one application (e.g., backend cache arrays) may not meet specifications for other applications (e.g., a multi-core front-end/platform cache array that operates with a lower frequency) that require additional pipeline time to meet reliability requirements, e.g., error correction code operations, or other platform functional features. Furthermore, the timing margin associated with an individual pipeline stage may vary dynamically (e.g., due to temperature variations, power supply voltage level variations, operating frequency adjustments, or changes to other operation conditions) and detrimentally impact performance and power consumption of the pipelined memory circuit. Accordingly, new techniques for operating a memory circuit are desired.

A technique for operating a memory circuit that improves performance of the memory circuit and/or power consumption for at least some operating points of the memory circuit includes adjusting a number of operational pipeline stages at least partially based on an operating point of the memory. In at least one embodiment of the invention, a method for operating a memory circuit includes selecting a mode of operating the memory circuit at least partially based on a feedback signal generated by the memory circuit. The method includes operating the memory circuit using a number of pipeline stages based on the selected mode of operation of the memory circuit. In at least one embodiment of the invention, the technique includes sensing a timing margin associated with an individual pipeline stage and generating the feedback signal based thereon.

Figure 1:
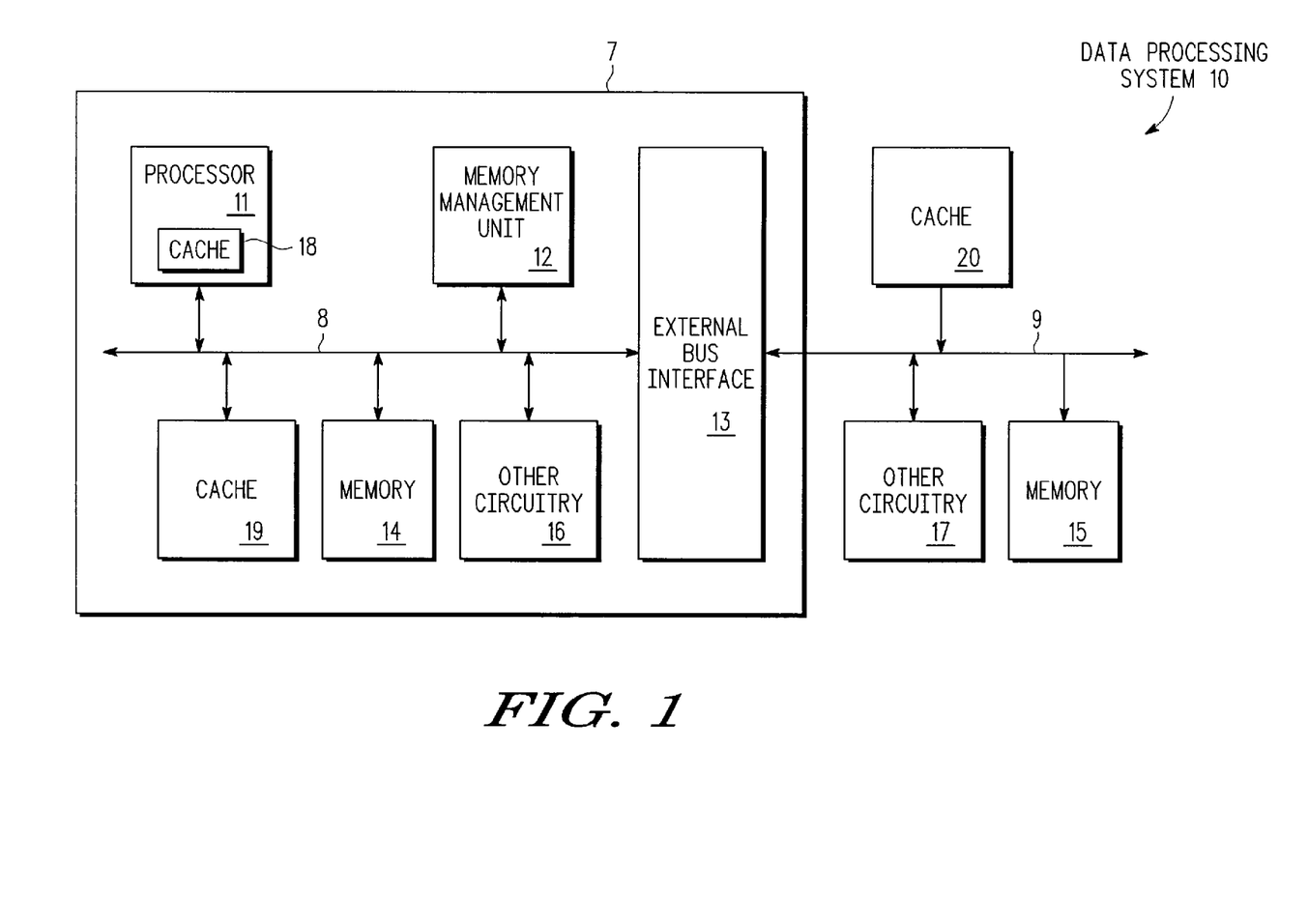
FIG. 1 is a block diagram of an exemplary data processing system consistent with at least one embodiment of the present invention.

Referring to FIG. 1, an exemplary data processing system includes an integrated circuit (e.g., integrated circuit 7), which may be coupled to external circuitry (e.g., other circuitry 17, cache memory circuit 20, and memory circuit 15) via an interface (e.g., external bus interface 13 and bus 9). The integrated circuit may include a processor circuit (e.g., processor circuit 11), which may include a cache memory circuit (e.g., cache memory circuit 18). Processor circuit 11 may be a microprocessor, microcontroller, digital signal processor, or other suitable information processing circuitry. In addition, in at least one embodiment of data processing system 10, integrated circuit 7 includes other circuitry (e.g., cache memory circuit 19, memory circuit 14, memory management unit 12, and other circuitry 16) which are coupled to the processor circuit (e.g., via bus 8). Types, numbers or arrangements of components shown within integrated circuit 7 are merely illustrative and persons of ordinary skill will appreciate that systems and/or integrated circuit embodiments consistent with the present invention may, more generally, include other types, numbers, and arrangements of components.

In general, memories 14, 15, 18, 19, and 20 may store any type of information (e.g., address, data, tag, or other suitable information) in which (or in conjunction with) pipelined array accesses are performed at some level in the memory hierarchy. Similarly, cache(s) 19 and/or other components of similar design may appear as part of a memory management unit. Although FIG. 1 shows separate memory(s) 14 and cache(s) 19, other realizations consistent with the present invention may include one, but not the other, or may combine two or more levels of a memory hierarchy into one element or block.

Although components are described as being embodied as exemplary integrated circuit 7, in other embodiments, one or more components may be implemented in separate integrated circuits. Internal components of illustrated integrated circuit 7 are interconnected and interoperate using any suitable techniques. For simplicity, interconnection of major functional blocks is illustrated by bus 8, although persons of ordinary skill in the art will recognize that any of a variety of interconnection techniques and topologies may be employed without departing from the present invention.

Figure 2:
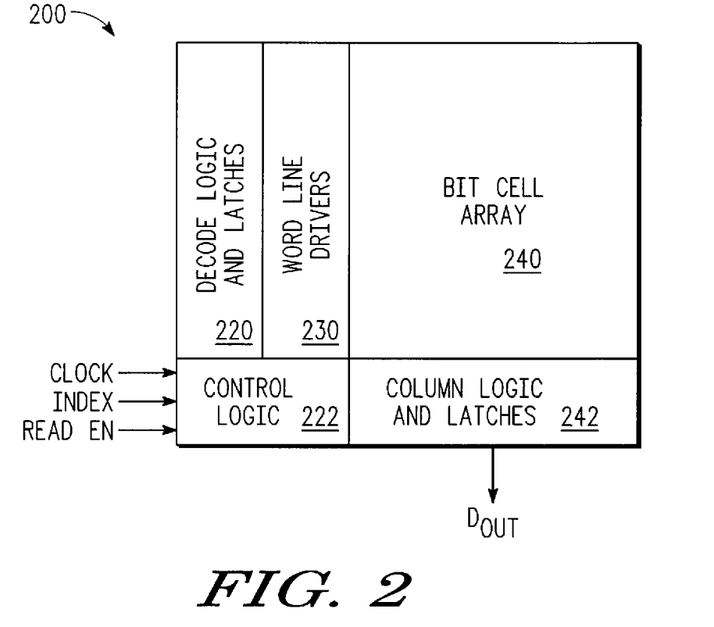
FIG. 2 is a block diagram of an exemplary pipelined memory circuit.

The techniques described herein may be embodied in one or more of the memory circuits of data processing system 10 or other suitable memory circuits. Although the techniques will be described with regards to an exemplary cache memory circuit, one of ordinary skill in the art will recognize that any of a variety of memory circuits may be employed. Referring to FIG. 2, exemplary cache memory circuit 200 includes decode logic and latches circuit 220, word line drivers 230, bit cell array 240, column logic and latches 242, and control logic circuit 222. Cache memory circuit 200 is an exemplary pipelined memory circuit that partitions a memory access into multiple stages at suitable boundaries. Individual pipeline stages are controlled by control logic circuit 222, which generates control signals in response to a control clock signal, a read enable signal, and an index value. For example, cache memory circuit 200 may be partitioned into two pipeline stages. A first pipeline stage may include a decode logic stage (e.g., decode logic and latches circuit 220), word line drivers (e.g., word line drivers 230), and a memory array (e.g., bit cell array 240). The decode logic stage at least partially decodes an address (e.g., index) and stores the result. The output of decode logic and latches circuit 220 is provided to word line drivers 230 and bit cell array 240, which provides memory contents to a second pipeline stage, including, e.g., column logic and latches circuit 242. Particular column outputs are selected and new data may be provided on DOUT with a throughput of one new data value per clock cycle and a latency of two clock cycles.

For at least one operating point, cache memory circuit portion 200 is partitioned into pipeline stages that execute a corresponding portion of the memory access utilizing a full cycle of a control clock signal for operating at target performance (i.e., a target frequency of the control clock signal, e.g., 2 GHz). However, cache memory circuit portion 200 may be configured for a different operating point, e.g., an operating point with a lower power supply voltage and/or a lower control clock signal frequency than those of the target performance operating point. Accordingly, the power supply voltage level and/or the frequency of the control clock signal of cache memory circuit portion 200 is reduced, thereby increasing the latency of cache memory circuit portion 200. As a result of the reduction of the frequency of the control clock signal with a consistent power supply voltage level, or the reduction of both frequency of the control clock signal and power supply voltage level, timing margin in individual pipeline stages increases.

Figure 3:
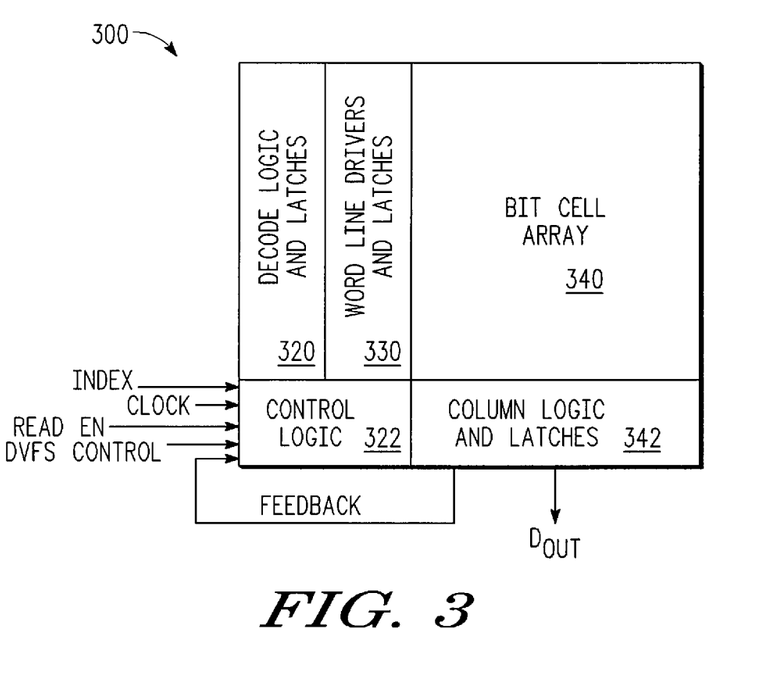
FIG. 3 is a block diagram of an exemplary pipelined memory circuit consistent with at least one embodiment of the present invention.

Since the full period of the control clock signal is not utilized by the individual pipeline stages in cache memory circuit portion 200 for the fully-pipelined mode operating at a lower operating point, cache memory circuit portion 300 of FIG. 3 includes an adjustable pipeline. Under certain conditions, the pipeline may be configured to operate with fewer stages (i.e., in one or more flush-through modes) of cache memory circuit portion 300, thereby reducing the latency of cache memory circuit portion 300 as compared to fully-pipelined operation at the same operating point. Thus, cache memory circuit portion 300 can be dynamically configured to utilize excess timing margin at operating points having lower power supply voltage level and/or a lower control clock signal frequency than at the target operating point. For example, when cache memory circuit portion 300 is configured for peak performance (e.g., $f_{PEAK}$, $V_{PEAK}$), all flush-through modes are disabled. However, when cache memory circuit portion 300 is configured to operate in a low-power mode (e.g., $f_{PEAK}/2$, $V_{DD2}$), a first flush-through mode using at least one fewer pipeline stage than in the fully-pipelined mode may be enabled. When cache memory circuit portion 300 is configured to operate in an even lower-power/performance mode (e.g., $f_{PEAK}/4$, $V_{DD3}$), a corresponding flush-through mode, using even fewer pipeline stages, may be enabled. In at least one embodiment of cache memory circuit portion 300, control logic 322 configures cache memory circuit portion 300 to operate in those low-power modes based on an indicator (e.g., DVFS CONTROL) of scaled power supply voltage level and/ or scaled frequency of operation of at least portions of integrated circuit 7, which may be generated by any suitable technique. In at least one embodiment of cache memory circuit portion 300, the DVFS CONTROL signal is generated by a control unit (e.g., control system 900 of FIG. 9, described below) that adjusts the power supply voltage level received by at least portions of cache memory circuit portion 300 and/or the frequency of a control clock signal used to control the timing of operations in cache memory circuit portion 300.

Although components are described as being embodied as exemplary cache memory circuit portion 300, in at least one embodiment of data processing system 10 of FIG. 1, one or more components are implemented outside of a corresponding memory circuit portion and shared with other circuitry. For example, a person of ordinary skill in the art will appreciate that at least a portion of the functions of control logic circuit 322 may be implemented by other portions of integrated circuit 7 or by other portions of data processing system 10.

Figure 4:
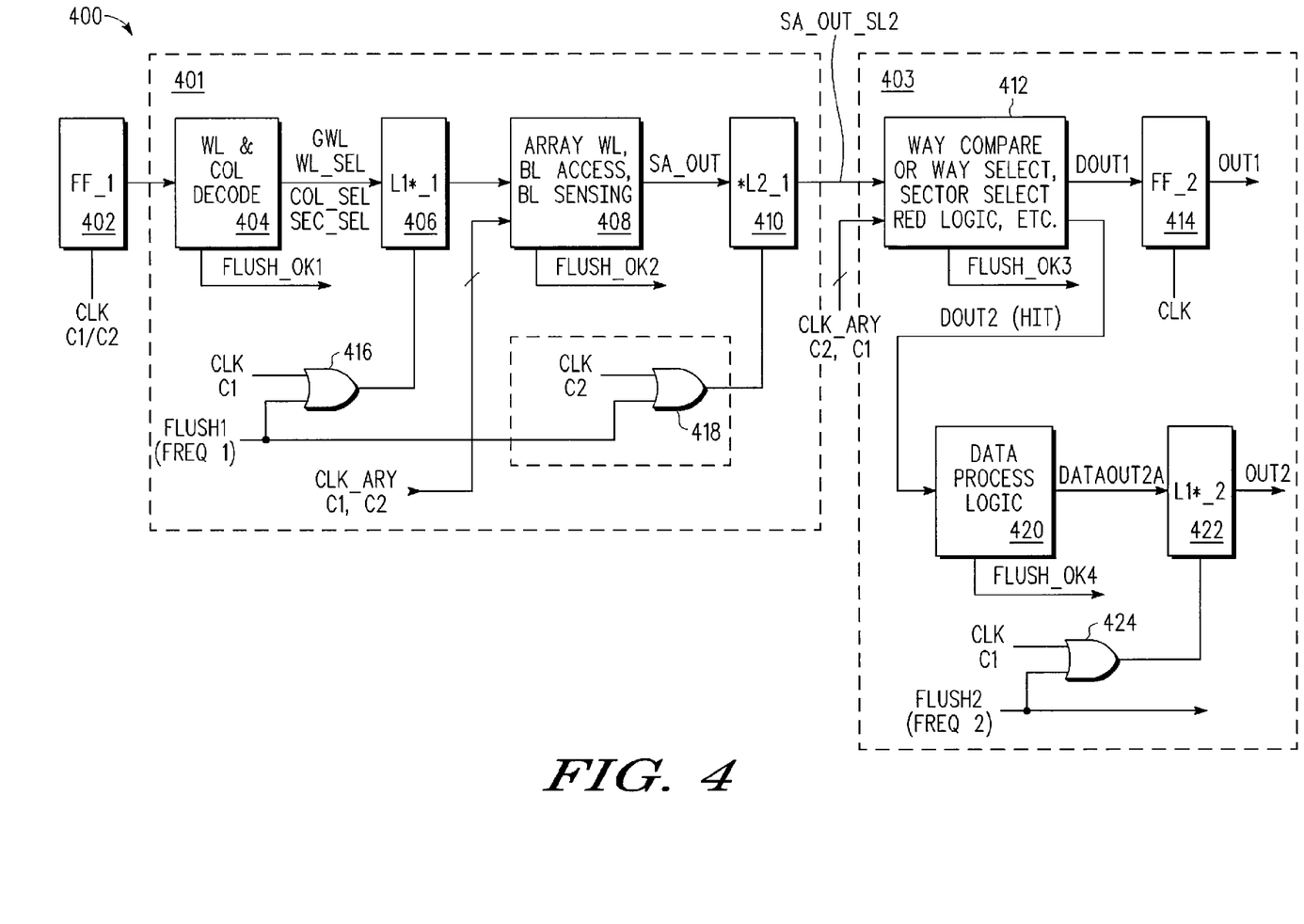
FIG. 4 is a block diagram of an exemplary pipelined memory circuit portion consistent with at least one embodiment of the present invention.

Referring back to FIG. 3, an exemplary cache memory circuit portion 300 includes an adjustable pipeline having exemplary partitioning of operations as illustrated in memory circuit portion 400 of FIG. 4. The operations of decode logic and latches 320, word line drivers 330, and bit cell array 340 of cache memory circuit portion 300 are combined into a first pipeline stage (e.g., pipeline stage 401 of FIG. 4) and the operations of column logic and latches 342 of FIG. 3 and additional logic circuitry are combined into a second pipeline stage (e.g., pipeline stage 403 of FIG. 4).

Figure 5:
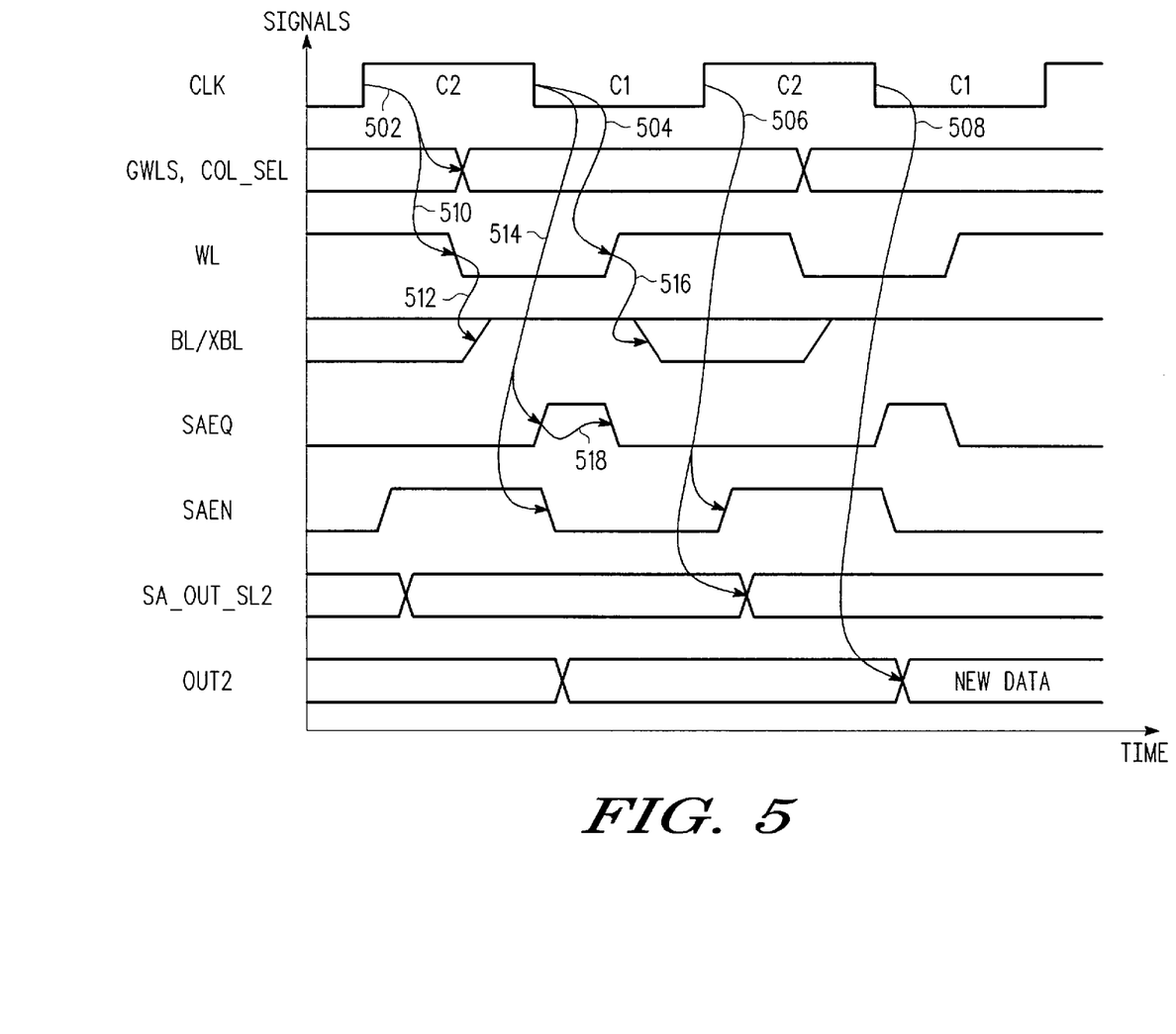
FIG. 5 is a timing diagram illustrating waveforms of the pipelined memory circuit portion of FIG. 4 configured consistent with at least one embodiment of the present invention.

Referring to FIGS. 4 and 5, pipeline stage 401 includes front-end circuit 404 that performs a decode function of an index or memory address and generates outputs (e.g., word line select, column select, and sector select). During fully-pipelined operation, outputs of front-end circuit 404 change (e.g., transition 502) during the high phase of the control clock signal (e.g., C2 phase of CLK) and are latched by latch 406, which passes data during the low phase of the control clock signal (e.g., C1 phase of CLK) to the back-end circuit 408. In at least one embodiment of memory circuit portion 400, front-end circuit 404 includes row decoders, column decoders, multiplexer circuitry, and/or other suitable circuitry.

Pipeline stage 401 also includes a back-end circuit 408 that accesses the memory array by asserting word lines and sensing and accessing bit lines of the memory array circuit. In at least one embodiment of memory circuit portion 400, back-end circuit 408 includes sense amplifiers, memory cells, multiplexer circuitry, and/or other suitable circuitry. Note that in at least one embodiment of memory circuit portion 400, back-end circuit 408 includes dynamic logic circuitry, e.g., a logic structure including an output node that is precharged to a particular voltage level during a first phase of a control clock signal and conditionally discharged during another phase of the control clock signal.

For example, in at least one embodiment of memory circuit portion 400, back-end circuit 408 accesses data from a memory cell and provides it to a data out signal e.g., selects a word line and develops corresponding signals on bit lines. The bit lines coupled to an array in back-end circuit 408, are precharged during the high phase of the control clock signal (e.g., transition 512). The word line select signals transition (e.g., transition 504 of WL) during the low phase of the control and the signals are developed on the bit lines during the low phase of the control clock signal (e.g., transition 516). The nodes in the sense amplifier are set to quiescent values when e.g., SAEQ, is high, during a first portion of the low phase of the control clock signal (e.g., transition 514), and reset to low just before the word line select signals are activated high (e.g., transition 518 of SAEQ). The data on the bit lines are sensed when SAEN is high (e.g., transition 506) and the output of back-end circuit 408 is passed to a next circuit by latch 410 (e.g., SA_OUT_SL2) accordingly. The latched version of the sense amplifier output of the memory array (e.g., SA_OUT_SL2) is then provided to pipeline stage 403. During fully-pipelined operation, the operation of front-end circuit 404 during a first phase of the control clock signal and the operation of the back-end circuit 408 during the second phase of the control clock signal results in execution of a word-line and column decode and memory array of pipeline stage 401 in one full cycle of the control clock signal.

In at least one embodiment of the invention, pipeline stage 403 includes selection circuit 412, which selects appropriate signals from the SA_OUT_SL2 signal (e.g., way selection, sector selection, data re-alignment, or other suitable operations). During fully-pipelined operation, the output of selection circuit 412 is stored in flip-flop 414 and new data is provided by memory circuit portion 400 after the falling edge of the control clock signal (e.g., transition 508). In at least one embodiment of the invention, pipeline stage 403 also includes data processing logic circuit 420, which performs logic processing of appropriate signals included in the SA_OUT_SL2 signal, e.g., error correction code operations, and/or other suitable processing. During fully-pipelined operation, the output of data processing logic 420 is latched during a particular phase of the control clock signal. Accordingly, during fully-pipelined operation, the data selection and processing operations of pipeline stage 403 execute in at least one half-cycle of the control clock signal.

Figure 6:
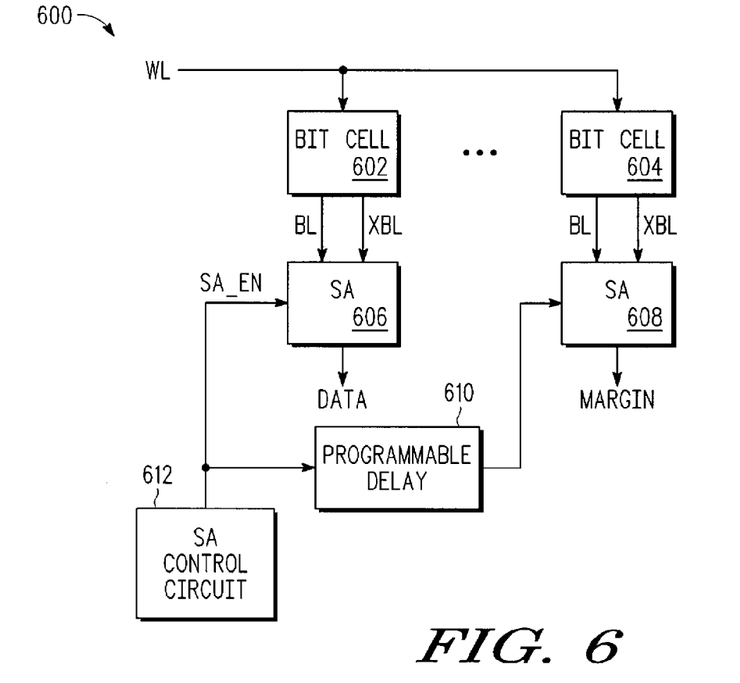
FIG. 6 is a block diagram illustrating an exemplary technique for generating a memory circuit feedback signal.

One or more individual circuit portions of memory circuit portion 400 generate feedback signals, e.g., flush_ok1, flush_ok2, flush_ok3, and flush_ok4, which indicate whether that circuit portion has excess timing margin and/or indicate the amount of timing margin for the corresponding circuit portion. Referring to FIG. 6, an exemplary circuit portion that may be included in back-end circuit 408 generates a signal that may be a flush_ok signal. Circuit 600 illustrates bit cell 602, which is included in the memory array. The bit lines BL and XBL are precharged and discharged during a read access to reflect the contents of bit cell 602. Sense amplifier 606 generates a data signal based on its evaluation of BL and XBL according to the SA_EN signal. Programmable delay circuit 610 is used to determine the margin of the read operation by delaying the SA_EN signal to another sense amplifier similar to sense amplifier 606 (e.g., sense amplifier 608). If the output of sense amplifier 608 evaluates properly, then timing margin exists that may be quantified based on the magnitude of the programmable delay using any suitable technique.

Figure 7:
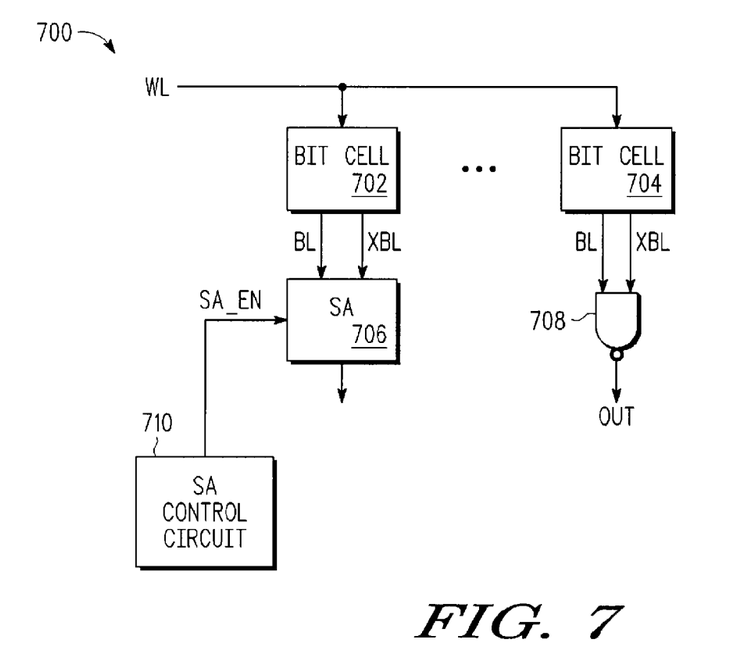
FIG. 7 is a block diagram illustrating an exemplary technique for generating a memory circuit feedback signal.

Referring to FIG. 7, another embodiment of a feedback signal generation circuit that may be included in back-end circuit 408 includes NAND gate sensing circuit 708. Bit cell 702 and sense amplifier 706 are controlled by circuit 710. NAND gate sensing circuit 708 has a predetermined trigger point that is a fraction of $V_{DD}$ ($k*V_{DD}$). If timing margin exists, then the NAND gate sensing circuit will properly evaluate the output of bit cell 704. The timing margin may be quantified based on the trigger point of NAND gate sensing circuit 708 using any suitable technique.

Referring back to FIG. 4, although memory circuit portion 400 includes one feedback signal for each of front-end circuit 404, back-end circuit 408, selection circuit 412, and data processing logic circuit 420, in at least one embodiment of memory circuit portion 400, a feedback signal may be generated by only one or more of the individual circuit portions. For example, any one pipeline stage of a substantially balanced pipeline may generate a feedback signal indicating whether or not timing margin exists or indicating the amount of timing margin in the pipeline stages. Alternatively, only a worst-case pipeline stage generates a feedback signal. In at least one embodiment of memory circuit portion 400, the feedback signal(s) may be used by a control circuit coupled to memory circuit portion 400 (e.g., control logic circuit 322 of FIG. 3) to select a mode of operation. The selected mode of operation may be a fully-pipelined mode of operation or a flush-through mode of operation, i.e., a mode of operation in which the pipeline executes using a reduced number of pipeline stages. A particular memory circuit may have multiple flush-through modes that differ by the number of pipeline stages that are merged into another pipeline stage (i.e., flushed-through). For example, a memory circuit that has a four-stage pipeline in fully-pipelined operation may also separately operate in flush-through modes that correspond to individual configurations of the memory circuit having three pipeline stages, two pipeline stages, or one stage (i.e., no pipelining within the memory circuit itself, but including state elements at the boundaries of the memory circuit).

In a flush-through mode of operation, one or more state elements of the pipeline are configured to be transparent. For example, a state element may be bypassed entirely using a multiplexer to select from a path including the state element or an alternate path that bypasses the state element. Alternatively, in a flush-through mode, a state element may be configured to pass input signals directly to an output node asynchronously to the control clock signal. In at least one embodiment of memory circuit portion 400, rather than bypass a state element, the control clock signal is logically ORed with a control signal indicating a flush mode. For example, flush1 is used to control latch 406 and latch 410. When flush1 is low, latches 406 and 410 are configured to pass respective input signals to corresponding output nodes synchronously with respect to the clock control signal. When flush1 is high, latches 406 and 410 are configured to pass respective input signals to corresponding output nodes asynchronously with respect to the clock control signal. As a result, pipeline stages 401 and 403 are combined into a single pipeline stage that executes the operations corresponding to those pipeline stages with a reduced latency as compared to a fully-pipelined configuration.

Figure 8:
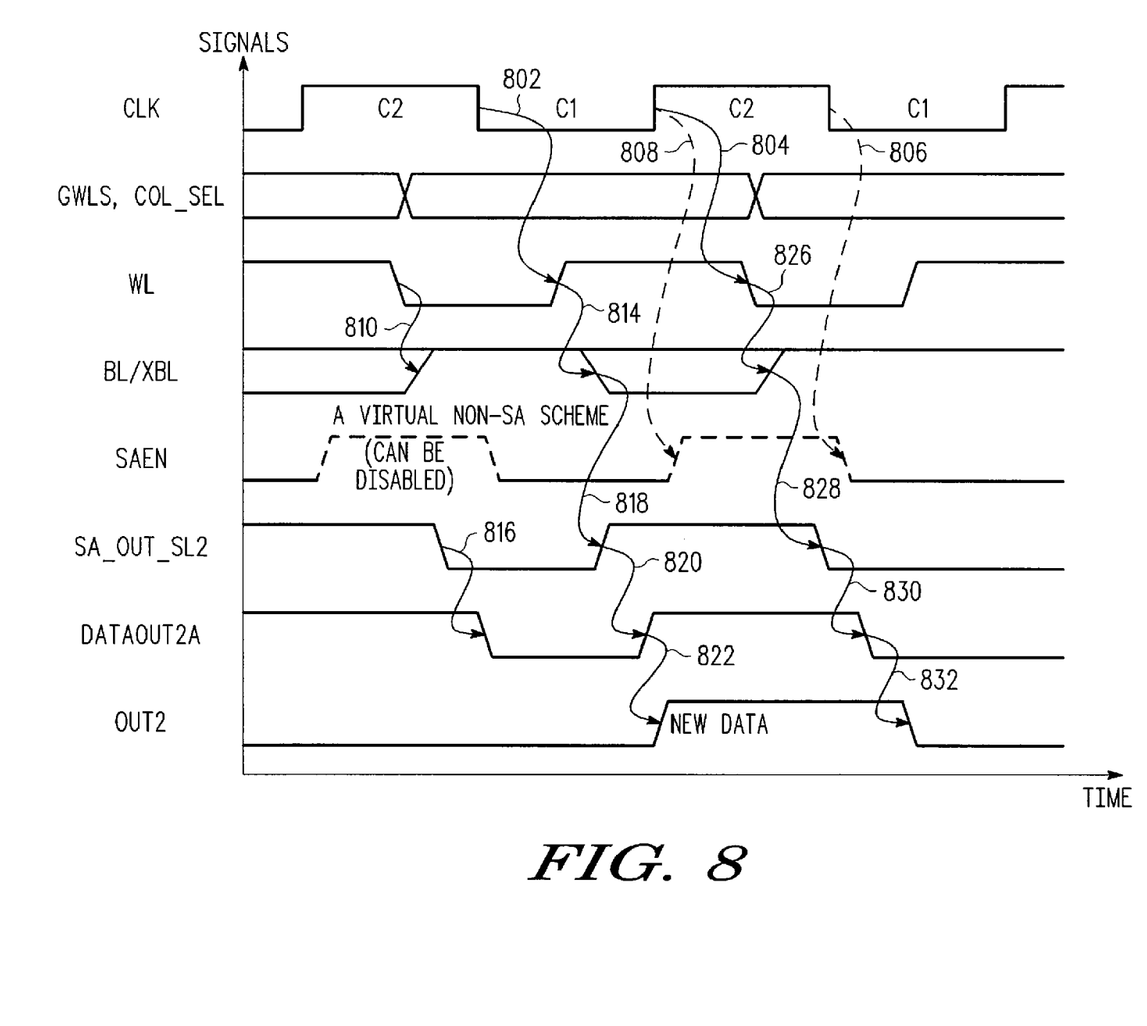
FIG. 8 is a timing diagram illustrating waveforms of the pipelined memory circuit portion of FIG. 4 configured consistent with at least one embodiment of the present invention.

Referring to FIGS. 4 and 8, when memory circuit portion 400 is configured for a first flush-through mode of operation (e.g., flush1='1' and flush2='0') that corresponds to a first clock frequency threshold (e.g., $f_{PEAK}/2$), outputs of front-end circuit 404 change during the high phase of the control clock signal and are passed through latch 406 to the back-end circuit 408. The bit lines coupled to an array in back-end circuit 408 are precharged during the high phase of the control clock signal (e.g., transition 810). The word line select signals transition (e.g., transition 802) during the low phase of the control and the signals are developed on the bit lines during the low phase of the control clock signal. In at least one embodiment of back-end circuit 408, the sense amplifier is enabled in a flush-through mode of operation. Accordingly, the data on the bit lines are sensed when SAEN is high (e.g., transition 808 with dashed SAEN waveform) and the output of back-end circuit 408 is passed through latch 410 (e.g., SA_OUT_SL2) to pipeline stage 403.

In at least one embodiment of back-end circuit 408, the SAEN signal is disabled in a flush-through mode of operation allowing the selected bit line to propagate through a disabled sense amplifier and generate SA_OUT and SA_OUT_SL2 through latch 410 (e.g., transition 818) to pipeline stage 403. Particular portions of the array output are selected by selection circuit 412 and provided to data processing logic circuit 420. The results of data processing logic circuit 420 are then passed through to OUT2 during the low phase of the control clock signal (e.g., transition 822). New data is provided by memory circuit portion 400 during the low phase of the control clock signal and valid after the rising edge of the control clock signal (e.g., defined by transitions 822 and 832). Note that data is provided at the output with improved latency (e.g., improved by up to one half of a clock cycle when the sense amplifier is enabled and improved by greater than one half of a clock cycle when the sense amplifier is disabled) as compared to the fully-pipelined configuration.

Referring back to FIG. 4, in at least one embodiment of memory circuit portion 400, as the latency of the pipeline increases with decreased clock frequency, the number of pipeline stages may be decreased further by combining additional pipeline stages into a single pipeline stage using one or more additional control signals, e.g., flush2, which corresponds to a second clock frequency threshold (e.g., $f_{PEAK}/4$). For example, when the control clock signal frequency falls below the second clock frequency threshold, flush2 is asserted, thereby configuring latch 422 to be transparent. Accordingly, DOUT2A passes to OUT2 without substantial delay and asynchronously to the clock control signal. As a result, front-end circuit 404, back-end circuit 408, selection circuit 412, and data processing logic circuit 420 form a single pipeline stage having a latency of at most one cycle of the control clock signal. Note that the memory circuit partitioning of FIG. 4 is exemplary only. Persons of ordinary skill in the art will appreciate that other embodiments of a pipelined memory circuit may be partitioned with other suitable circuit boundaries.

Figure 9:
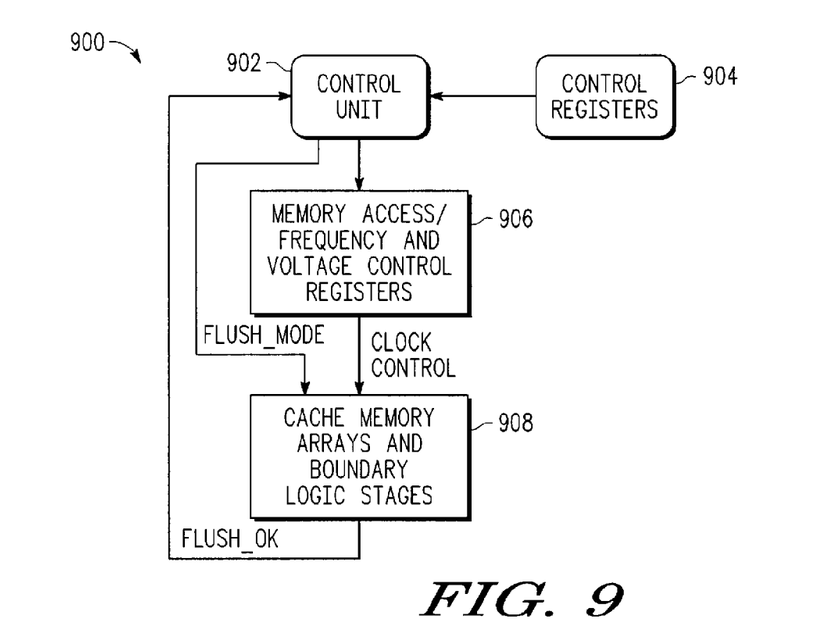
FIG. 9 is a block diagram of an exemplary control system consistent with at least one embodiment of the present invention.

Referring to FIG. 9, an exemplary integrated circuit processor (e.g. processor 11 of FIG. 1) includes at least portions of control system 900. In at least one embodiment of control system 900, control unit 902 detects an input (e.g., state of a fuse coupled to integrated circuit 7 or a signal on an input pin of integrated circuit 7 of FIG. 1) to configure cache memory circuit 908 for fully-pipelined operation or flush-through operation. In at least one embodiment, control unit 902 dynamically scales power supply voltage level and/or clock signal frequency of processor 11 according to the contents of control registers 904. Control registers 904 may be set by hardware and/or software. For example, software executing on the integrated circuit processor may configure control registers 904 based on instructions executing on processor 11 of FIG. 1. Those instructions configure the integrated circuit processor in a low-power mode, either by instruction type (e.g., L2 nap, deep nap, snoops, or when all threads are idle) or by additional predecode bits in instructions. In at least one embodiment, the integrated circuit processor selects a pipeline mode of operation based on a table of pipeline mode of operation information and corresponding values of one or more frequencies of the control clock signal of the memory circuit and one or more levels of the power supply voltage. The integrated circuit processor accesses the table (e.g., a table stored in control registers 904 or other suitable storage circuit) using one or more of target latency of the memory circuit and a target power consumption to determine a corresponding mode of operation and configures control registers 906 accordingly.

In at least one embodiment, the integrated circuit processor writes control registers 904 based on one or more inputs received from pads or pins to initiate a low-frequency and/or low-power mode. Referring back to FIG. 9, control unit 902 configures local memory control signals (e.g., control clock signal frequency and power supply voltage levels) for each memory circuit based on the contents of control registers 904. Those values may be stored in memory access frequency and voltage control registers 906, which are used to control cache memory circuit 908.

Figure 10:
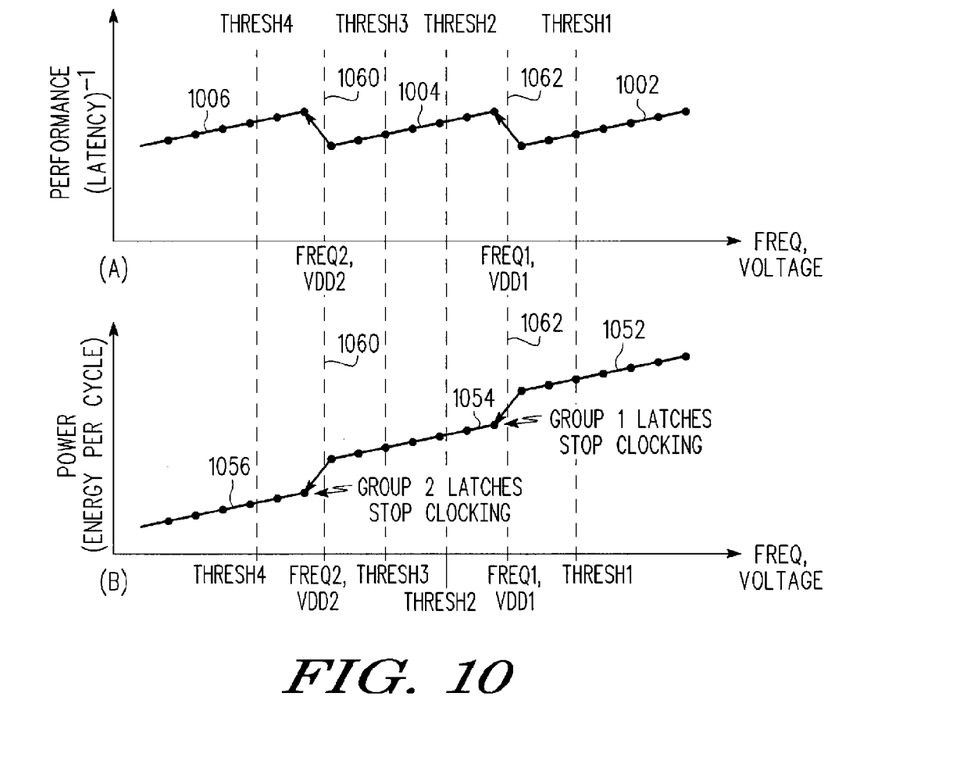
FIG. 10 illustrates exemplary operating points of a memory structure consistent with at least one embodiment of the present invention.

Control unit 902 also generates one or more flush mode control signals for dynamically selecting whether the cache memory circuit 908 operates in fully-pipelined mode or in a flush-through mode. Referring to FIGS. 9 and 10, in at least one embodiment, control unit 902 enables or disables a particular flush-through mode by comparing an operating point of a particular memory circuit to one or more predetermined threshold levels (e.g. ($f_{FREQ1}, V_{DD1}$), ($f_{FREQ2}, V_{DD2}$), THRESH1, THRESH2, THRESH3, and THRESH4), which are stored in a memory circuit (memory control registers 906 or other suitable memory circuit). The threshold levels may be determined and utilized based on one or more of simulation, target operating points, temperature, other environmental factors, or other suitable parameters. In addition, the threshold levels may be determined to introduce hysteresis into the control loop, e.g., to guarantee operation of the pipeline stages and to reduce excessive switching between modes of operation. In at least one embodiment, memory control registers 906 include a target frequency of the control clock signal and a target level of the power supply voltage.

Referring to FIG. 10, exemplary performance (e.g. latency) and power consumption during fully-pipelined operation, a first flush-through mode of operation, and a second flush-through mode of operation as a function of operating point are illustrated. Curve portions 1002 and 1052 correspond to performance and power consumption, respectively, of a memory circuit portion configured in fully-pipelined operation, e.g., having n pipeline stages. Curve portions 1004 and 1054, correspond to performance and power consumption, respectively, of the memory circuit portion configured in a first flush-through mode of operation, e.g., having n-1 pipeline stages. Curve portions 1006 and 1056, correspond to performance and power consumption, respectively, of the memory circuit portion configured in a second flush-through mode of operation, e.g., having n-2 pipeline stages. Transition points between the modes may be determined based on one or more of simulation, target power consumption and performance at particular operating points, temperature, other environmental factors, or other suitable parameters.

Referring back to FIG. 4, a memory access from flip-flop 402 to the output of flip-flop 414 has a latency of two cycles of the control clock signal when configured for fully-pipelined mode, e.g., control clock signal frequency equals $f_{PEAK}$. When the frequency of the control clock is scaled from $f_{PEAK}$ to an operating point having a frequency f, $f_{FREQ2} < f < f_{FREQ1}$ (e.g., $f_{PEAK}/4 < f < f_{PEAK}/2$), that results in the total propagation delay of the logic in two pipeline stages being less than the control clock cycle. If the total delay is less than a predetermined percentage of the control clock cycle (e.g., 85% of the control clock cycle), at least a portion of performance lost when the clock was scaled down can be recovered by entering the flush-through mode, as indicated by the discontinuity in the performance from curve portion 1002 to curve portion 1004 at $f_{FREQ1}$, $V_{DD1}$. Similarly, when the control clock is further scaled to an operating point below $f_{FREQ2}$, $V_{DD2}$ (e.g., $f_{PEAK}/4$) latch 422 may also be set into flush-through mode, entering a second flush-through mode. At least a portion of performance lost when the clock is scaled below $f_{FREQ2}$ is recovered by entering the second flush-through mode, as indicated by the discontinuity in the performance from curve portion 1004 to curve portion 1006 at $f_{FREQ2}$, $V_{DD2}$.

Figure 11:
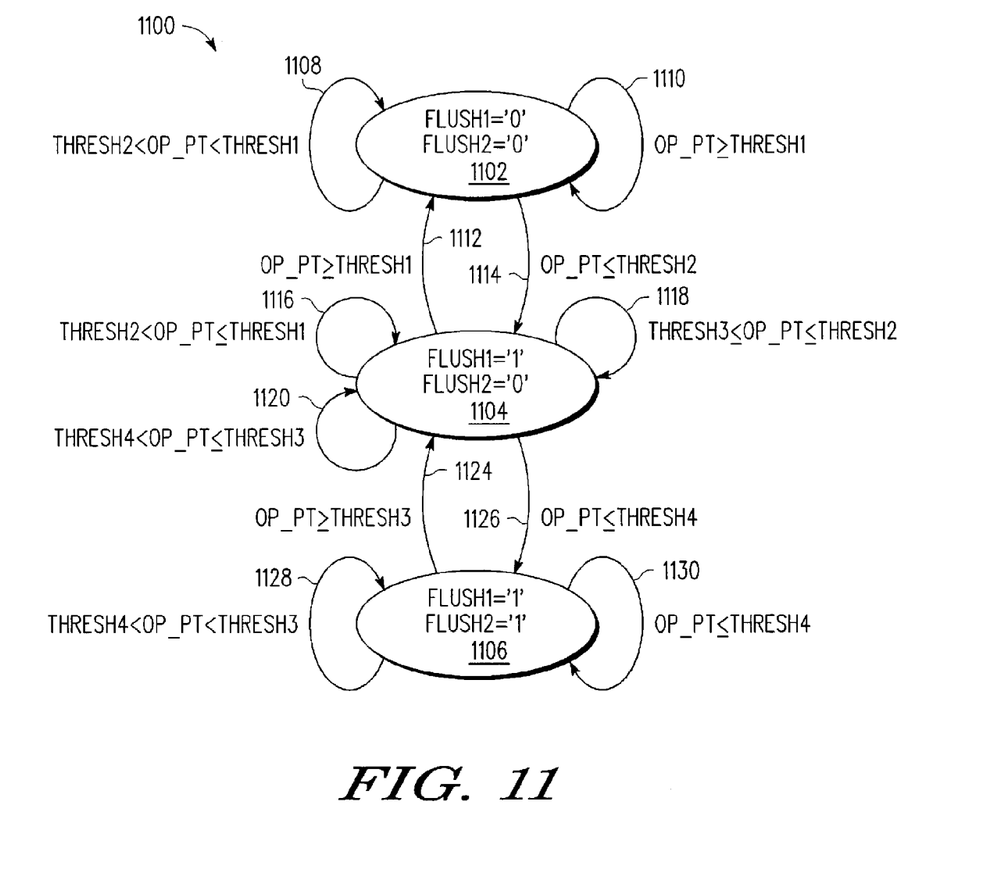
FIG. 11 is a state diagram illustrating an exemplary control flow consistent with at least one embodiment of the present invention.

Referring to FIGS. 9 and 11, in at least one embodiment of control system 900, control unit 902 introduces hysteresis into selecting the mode of operating the memory circuit, i.e., mode selection as a function of power supply voltage and/or control clock signal frequency is different for increasing values of power supply voltage and/or control clock signal frequency as compared to decreasing values of power supply voltage and/or control clock signal frequency. Mode selection as a function of power supply voltage and/or control clock signal frequency depends on the magnitude and direction of change to the power supply voltage and/or control clock signal frequency. Thus, the mode selection depends not only on the power supply voltage and/or control clock signal frequency, but also on the previous values of the power supply voltage and/or control clock signal frequency.

For example, in at least one embodiment, control unit 902 compares a next operating point to one or more threshold values (e.g., threshold values of FIG. 10) and generates one or more corresponding indicators based thereon. Control unit 902 then selects a pipelined mode of operation at least partially based on the one or more indicators. When cache memory circuit 908 is configured for fully-pipelined operation (e.g., state 1102), if a next operating point is greater than a first threshold (e.g., THRESH1), then cache memory circuit 908 continues to operate in fully-pipelined mode at the next operating point (1110). Similarly, when cache memory circuit 908 is configured for fully-pipelined operation and a next operating point is between a first and second threshold (e.g., the second threshold can be set at 85% of the first threshold), then cache memory circuit 908 continues to operate in fully-pipelined mode at the next operating point (1108). However, if the cache memory circuit 908 is configured for fully-pipelined operation and a next operating point is below the second threshold, then control unit 902 configures cache memory circuit 908 in a first flush-through mode (e.g., state 1104) at the next operating point (1114). In at least one embodiment of the control unit, no transition is made from state 1102 to state 1104 unless a feedback signal (e.g., flush_ok1 and/or flush_ok2 of FIG. 4) indicates that the memory has enough timing margin to support the second flush-through mode.

When cache memory circuit 908 is operating in the first flush-through mode, (e.g., state 1104), if a next operating point is greater than the first threshold, then cache memory circuit 908 operates in fully-pipelined mode at the next operating point (1112). When cache memory circuit 908 is operating in the first flush-through mode, if a next operating point is greater than a fourth threshold but less than the first threshold, then cache memory circuit 908 operates in the first flush-through mode at the next operating point (1116, 1118, 1120). However, if the cache memory circuit 908 is configured for the first flush-through mode and a next operating point is below the fourth threshold, then cache memory circuit 908 operates in a second flush-through mode (e.g., state 1106) at the next operating point (1126). In at least one embodiment of the control unit, no transition is made from state 1104 to state 1106 unless memory feedback signals (e.g., flush_ok3 and/or flush_ok4 of FIG. 4) indicate that the memory circuit has enough timing margin to support the second flush-through mode.

When cache memory circuit 908 is operating in the second flush-through mode, (e.g., state 1106), if a next operating point is greater than a third threshold, then cache memory circuit 908 operates in first flush-through mode at the next operating point (1124). When cache memory circuit 908 is operating in the second flush-through mode, if a next operating point is less than the third threshold, then cache memory circuit 908 operates in the second flush-through mode at the next operating point (1128, 1130). Note that the first, second, third, and fourth threshold values must be chosen to guarantee that pipeline stages of memory circuit 400 will operate properly in corresponding modes of operation.

Referring back to FIG. 10, in addition to improving performance for some operating points as compared to those operating points having the performance of fully-pipelined operation, in at least one embodiment of cache memory circuit 908 the flush-through modes of operation provide an advantage of reduced power consumption. The power savings may be achieved by reducing switching of state elements (e.g., configured in a flow-through mode or a bypass mode that does not clock the state elements). In general, the power consumption of the state elements is significant in a memory circuit due to the large number of pipeline latches (e.g., 10,000 pipeline latches in an exemplary 1Mega Byte, Level Two cache). The flush-through modes of operating a memory circuit may further reduce power consumption from the power consumption of the fully-pipelined circuit operating with a reduced frequency control clock signal, as illustrated by the discontinuities in the power consumption from curve portion 1052 to curve portion 1054 and from curve portion 1054 to curve portion 1056 of FIG. 10.

Figure 12:
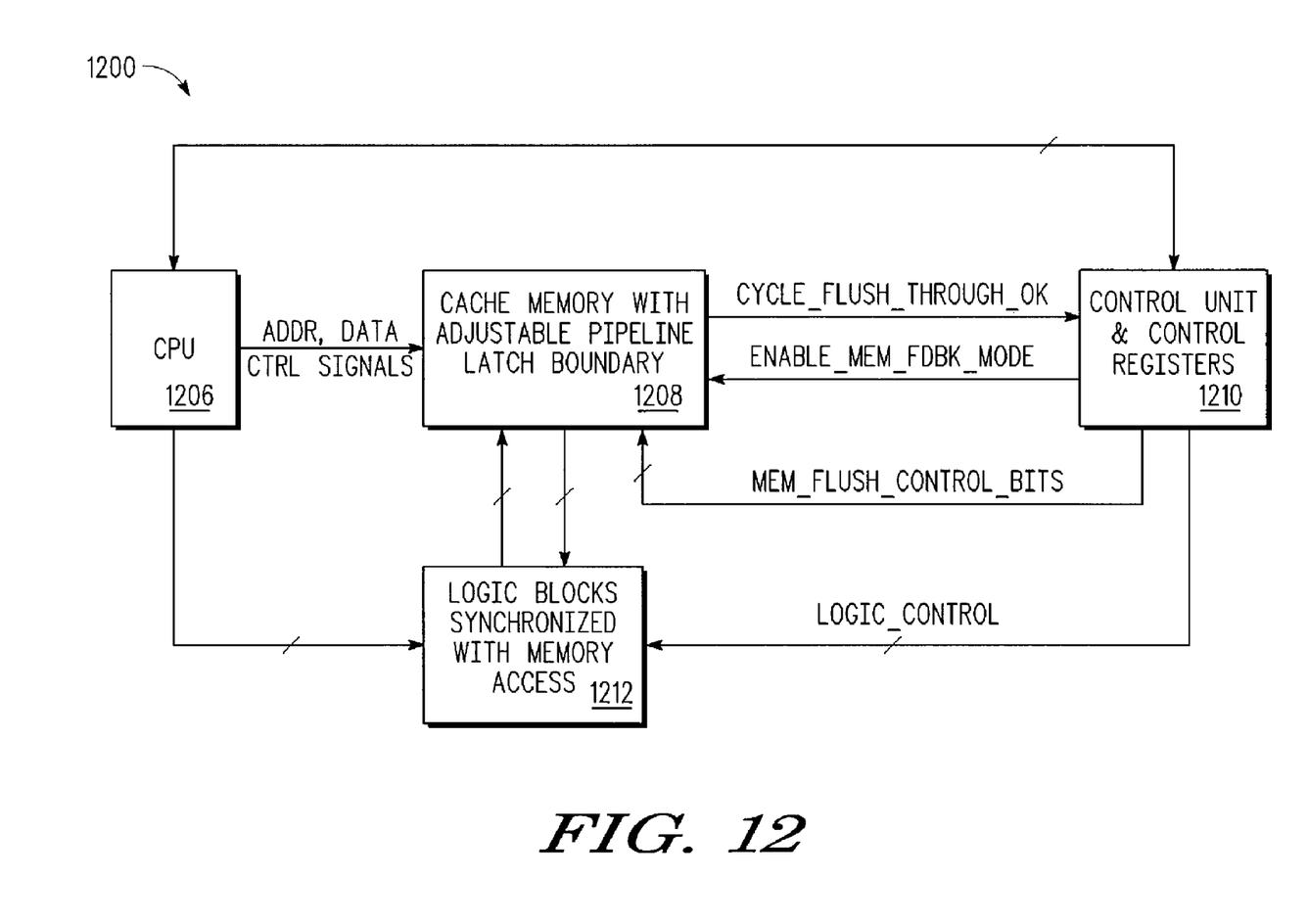
FIG. 12 is a block diagram of an exemplary control system consistent with at least one embodiment of the present invention.

Referring to FIG. 12, in at least one embodiment of the invention, logic circuits (e.g., logic blocks 1212) coupled to an adjustable pipeline memory circuit portion (e.g., cache memory circuit 1208) receive an indicator of a mode of operation of the memory circuit from control unit 1210. Control unit 1210 provides control signals to the logic circuits. The logic circuits receive logic control signals that may be used to synchronize the logic circuits with the memory circuit to receive inputs according to the variable latency of the memory circuit. The logic circuits may also be configured with an appropriate number of pipeline stages based on those control signals.

While circuits and physical structures are generally presumed, it is well recognized that in modem semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM), or electronic medium.

The description of the invention set forth herein is illustrative, and is not intended to limit the scope of the invention as set forth in the following claims. For example, while the invention has been described in an embodiment in which memory circuit portion 400 includes pipeline stages 401 and 403 in fully-pipelined mode, one of skill in the art will appreciate that the teachings herein can be utilized with a memory circuit portion partitioned into pipeline stages according to other suitable boundaries. Variations and modifications of the embodiments disclosed herein, may be made based on the description set forth herein, without departing from the scope and spirit of the invention as set forth in the following claims.

What is claimed is:

1. A method of operating a memory circuit comprising:
   selecting a mode of operating the memory circuit at least partially based on a feedback signal generated by the memory circuit; and
   operating the memory circuit using a number of pipeline stages, the number of pipeline stages being based on the selected mode of operation of the memory circuit.

2. The method, as recited in claim 1, further comprising:
   sensing a timing margin associated with an individual circuit portion of the memory circuit and generating the feedback signal based thereon.

3. The method, as recited in claim 1, wherein the mode of operation is selected partially based on at least one entry of a table of mode of operation information corresponding to values of at least one of frequency of a control clock signal of the memory circuit and level of a power supply voltage of the memory circuit.

4. The method, as recited in claim 3, wherein the mode of operation information is based on at least one of the group consisting of a target latency of the memory circuit and a target power consumption of the memory circuit corresponding to the at least one of frequency of the control clock signal and level of the power supply voltage.

5. The method, as recited in claim 1, wherein the mode of operation is selected further based on magnitude and direction of change of the mode of operation.

6. The method, as recited in claim 1, wherein the mode of operation is selected based on an instruction at least partially executed by one or more instruction processing units coupled to the memory circuit.

7. The method, as recited in claim 1, wherein the mode of operation is selected based on configuration information received from at least a pin of an integrated circuit including the memory circuit.

8. The method, as recited in claim 1, further comprising:
   comparing an operating point to at least one threshold value and generating an indicator based thereon,
   wherein the mode of operation is selected based on the indicator.

9. The method, as recited in claim 1, wherein operating the memory circuit using the number of pipeline stages comprises:
   providing results of a first circuit portion to a second circuit portion synchronously with respect to a control clock signal when the number of pipeline stages is a first number; and
   providing results of the first circuit portion to the second circuit portion asynchronously with respect to the control clock signal when the number of pipeline stages is a second number.

10. The method, as recited in claim 1, wherein operating the memory circuit using the number of pipeline stages comprises selectively configuring at least one state element to be transparent at least partially based on the number of pipeline stages.

11. The method, as recited in claim 10, wherein the at least one state element includes a latch circuit.

12. An integrated circuit comprising:
   a memory circuit; and
   a control circuit configured to select a mode of operation of the memory circuit at least partially based on a feedback signal generated by the memory circuit,
   wherein the memory circuit is configured to operate with a number of pipeline stages based on the selected mode of operation of the memory circuit.

13. The integrated circuit as recited in claim 12, wherein the feedback signal is indicative of timing margin associated with an individual circuit portion of the memory circuit.

14. The integrated circuit as recited in claim 12, further comprising:
   a second memory circuit coupled to the control circuit and configured to store mode of operation information corresponding to values of at least one of the group consisting of frequency of a control clock signal of the memory circuit and level of a power supply voltage of the memory circuit,
   wherein the control circuit is configured to select the mode of operation partially based on contents of the second memory circuit corresponding to a particular frequency of the control clock signal and a particular level of the power supply voltage.

15. The integrated circuit as recited in claim 14, wherein the contents of the second memory circuit are based on at least one of the group consisting of a target latency of the memory circuit and a target power consumption of the memory circuit corresponding to the particular frequency of the control clock signal and the particular level of the power supply voltage.

16. The integrated circuit as recited in claim 12, wherein the control circuit comprises at least one instruction processing unit configured to select the mode of operation at least partially based on at least partial execution of an instruction of a program executing on the integrated circuit.

17. The integrated circuit as recited in claim 12, wherein the memory circuit comprises:
  a first sense amplifier circuit configured to sense at least one of a plurality of bits from a memory array in response to a sense amplifier enable signal synchronous to a memory clock signal; and
  a second sense amplifier configured to sense a bit from at least one of the plurality of bits from the memory array in response to a delayed version of the sense amplifier enable signal and generate the feedback signal based on a differential voltage value generated at the output of the second sense amplifier.

18. The integrated circuit as recited in claim 12, wherein the memory circuit comprises:
  a first circuit portion;
  a second circuit portion; and
  a third circuit portion coupled between the first and second circuit portions and configurable in a first mode of operation and a second mode of operation,
  wherein in the first mode of operation, the third circuit portion receives results of the first circuit portion and provides the results of the first circuit portion as operands to the second circuit portion asynchronously with respect to a clock signal, thereby configuring the first and second circuit portions in the same pipeline stage, and
  wherein in the second mode of operation, the third circuit portion latches the results of the first circuit portion and provides the results of the first circuit portion as operands to the second circuit portion synchronously with respect to a transition of the clock signal, thereby configuring the first and second circuit portions in different pipeline stages.

19. The integrated circuit as recited in claim 18, wherein the first circuit portion comprises a memory word-line and column decode circuit and a memory data acquisition circuit and the third circuit portion comprises a memory line selection circuit.

20. The integrated circuit as recited in claim 18, wherein at least one of the first, second, and third circuit portions comprises a dynamic logic circuit.

21. An apparatus comprising:
  means for providing contents of an array of storage elements using a number of pipeline stages; and
  means for selecting a mode of operation of the means for providing at least partially based on a feedback signal generated by a means for providing,
  wherein the number of pipeline stages is based on a mode of operation of the means for providing,
  wherein the feedback signal is indicative of timing margin associated with an individual circuit portion of the memory circuit.

22. The method as recited in claim 1, wherein the memory circuit comprises the number of pipeline stages.

23. The apparatus as recited in claim 12, wherein the memory circuit comprises the number of pipeline stages.

24. The method as recited in claim 21, wherein the means for providing comprises the number of pipeline stages.

* * * * *